(Model.)
2 Sheets—Sheet 1.
R. WHELAN.
RENDERING APPARATUS.
No. 260,266. Patented June 27, 1882.
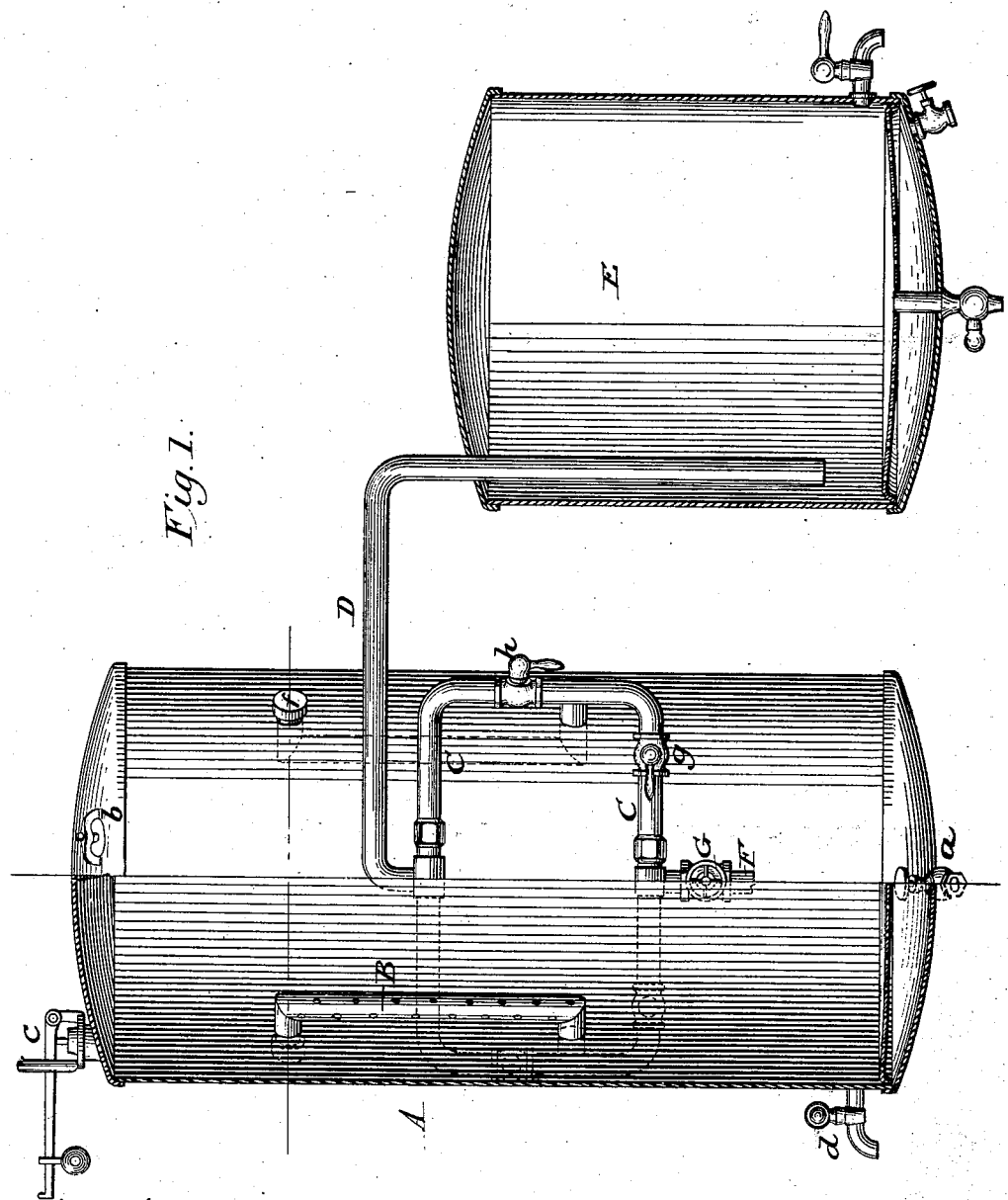
Attest.
Sidney P. Hollingsworth
Walter S. Dodge
Inventor.
Robert Whelan,
by Dodge Son,
Attys.

(Model.)
R. WHELAN.
RENDERING APPARATUS.
No. 260,266. Patented June 27, 1882.
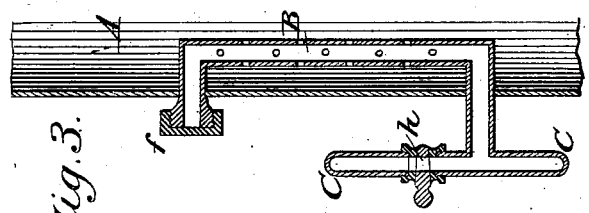
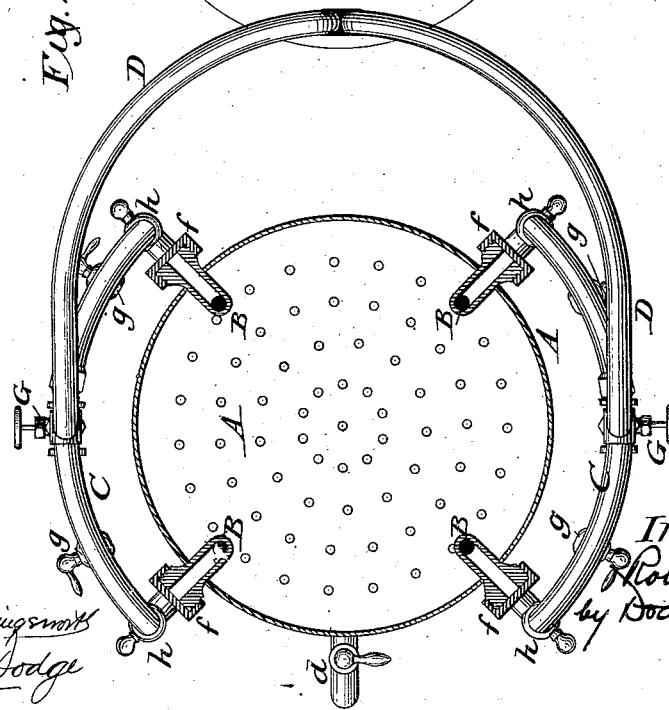
Attest.
Sidney P. Hollingsworth
Walter S. Dodge
Inventor.
Robert Whelan,
by Dodge & Son,
Attys.

UNITED STATES PATENT OFFICE.

ROBERT WHELAN, OF CHICAGO, ILLINOIS, ASSIGNOR OF ONE-HALF TO JOHN ARTHUR ATKINSON, OF SAME PLACE.

RENDERING APPARATUS.

SPECIFICATION forming part of Letters Patent No. 260,266, dated June 27, 1882.

Application filed May 5, 1882. (Model.)

*To all whom it may concern:*

Be it known that I, ROBERT WHELAN, of Chicago, in the county of Cook and State of Illinois, have invented certain Improvements in Rendering Apparatus, of which the following is a specification.

My invention relates to lard and fat rendering apparatus; and it consists in a novel arrangement of pipes and valves, whereby the lard and other matter, as fast as rendered, may be forced over to the jacket-kettle for further treatment, and whereby, also, the outlets may be readily cleared at any time.

In the accompanying drawings, Figure 1 represents a side elevation of my improved apparatus, partially broken away to show the interior; Fig. 2, a top plan view, also partially in section; and Fig. 3, a vertical section through one of the perforated discharge-pipes.

In apparatus of this character it is desirable to carry off the lard and other fatty matter as rapidly as rendered, in order to avoid discoloration or injury from long contact with the steam of the rendering-tank; and it is important to provide means whereby the outlet-passages may be quickly and thoroughly cleared whenever they become clogged, so that the operation of the apparatus may not be interrupted. With these objects in view I construct the apparatus in the following manner:

A represents the rendering tank or vessel, provided with a steam-inlet, $a$, a man-hole or charge-opening, $b$, a safety-valve, $c$, and a draw-off cock, $d$, all essentially the same as in the tanks now in use.

At the upper part of the tank, and within the same, I provide a series of perforated pipes, B, each passing through the wall of the tank at its upper end, and furnished on the outside with a cap, $f$, and also passing out through the wall of the tank at their lower ends, where they respectively connect with an endless pipe, C, from the upper side of which a pipe, D, passes to the jacket-kettle E, while a steam-pipe, F, provided with a valve, G, opens into its lower side or branch.

The pipe C is arranged in the form of a parallelogram, and the pipes B join the vertical end portions of the same about midway of the latter, each at a point between valves or cocks $g$ and $h$, as shown, while the steam-pipe F joins pipe C between the valves or cocks $g$, and the discharge-pipe D joins said pipe between the valves or cocks $h$. Under this arrangement it will be seen that if the cocks $g$ and $h$ are opened at the same time the steam will pass through pipe C, taking up the rendered lard or fat entering the same through pipes B, and will carry it through pipe D to the jacket-kettle E. If, however, the pipes B become clogged, the valves $g$ will be opened and the valves $h$ will be closed, thereby causing the steam to pass from pipe C into pipes B, where it will tend to force the accumulated material from the perforations into the interior of the tank; but if the pressure within the tank equals or nearly equals the pressure of steam delivered by pipe F the caps $f$ may be removed, whereupon the accumulated material in the pipes B will be forced out at the open end of said pipes, which may then be closed again. In all respects not particularly mentioned the apparatus will be of ordinary construction.

It is obvious that the precise form and arrangement of pipes herein shown need not be followed, and that hollow perforated vessels may be used instead of pipes B; but so long as the inside perforated pipes or vessels and the valves in the steam-pipe above and below their connection therewith are retained the details may be modified.

Valves or cocks may obviously be employed in lieu of caps $f$.

Having thus described my invention, what I claim is—

1. In a rendering apparatus, the combination of a steam-pipe communicating with the kettle which receives the product of the rendering-vessel, provided with valves $g$ and $h$, and a perforated pipe or body within the rendering-vessel, communicating with the steam-pipe at a point between the valves $g$ and $h$, substantially as and for the purpose explained.

2. In a rendering apparatus, a rendering-vessel provided with an internal perforated pipe or body, one or more, provided with a detachable cap or a cock at one end, and communicating at the opposite end with a steam-pipe, as and for the purpose set forth.

3. In a rendering apparatus, the combination of a tank or vessel, A, perforated pipes B, steam-pipes C D F, and valves or cocks *g h*, all arranged and operating as explained.

4. The herein-described rendering apparatus, consisting of vessels A and E, perforated steam-pipes B, provided with caps or cocks *f*, and communicating with pipe C, pipe C, provided with valves *g h*, discharge-pipe D, and steam-pipe F, all combined and arranged as shown and described.

ROBERT WHELAN.

Witnesses:
O. W. TURNER,
F. M. CORNELL.